No. 799,409. PATENTED SEPT. 12, 1905.
A. SLAYSMAN, Jr.
MACHINE FOR FORMING THE SIDE SEAMS OF SHEET METAL BODIES.
APPLICATION FILED JAN. 25, 1904.

5 SHEETS—SHEET 1.

Witnesses:
Samuel J. Williamson
J. Ferdinand Vogt.

Inventor:
Alexander Slaysman Jr.
By Mann & Co,
Attorneys:

No. 799,409. PATENTED SEPT. 12, 1905.
A. SLAYSMAN, Jr.
MACHINE FOR FORMING THE SIDE SEAMS OF SHEET METAL BODIES.
APPLICATION FILED JAN. 25, 1904.

5 SHEETS—SHEET 2.

Witnesses:
Samuel J. Williamson
G. Ferdinand Vogt

Inventor:
Alexander Slaysman Jr.
By
Mann & Co.
Attorneys:

No. 799,409. PATENTED SEPT. 12, 1905.
A. SLAYSMAN, Jr.
MACHINE FOR FORMING THE SIDE SEAMS OF SHEET METAL BODIES.
APPLICATION FILED JAN. 25, 1904.
5 SHEETS—SHEET 3.
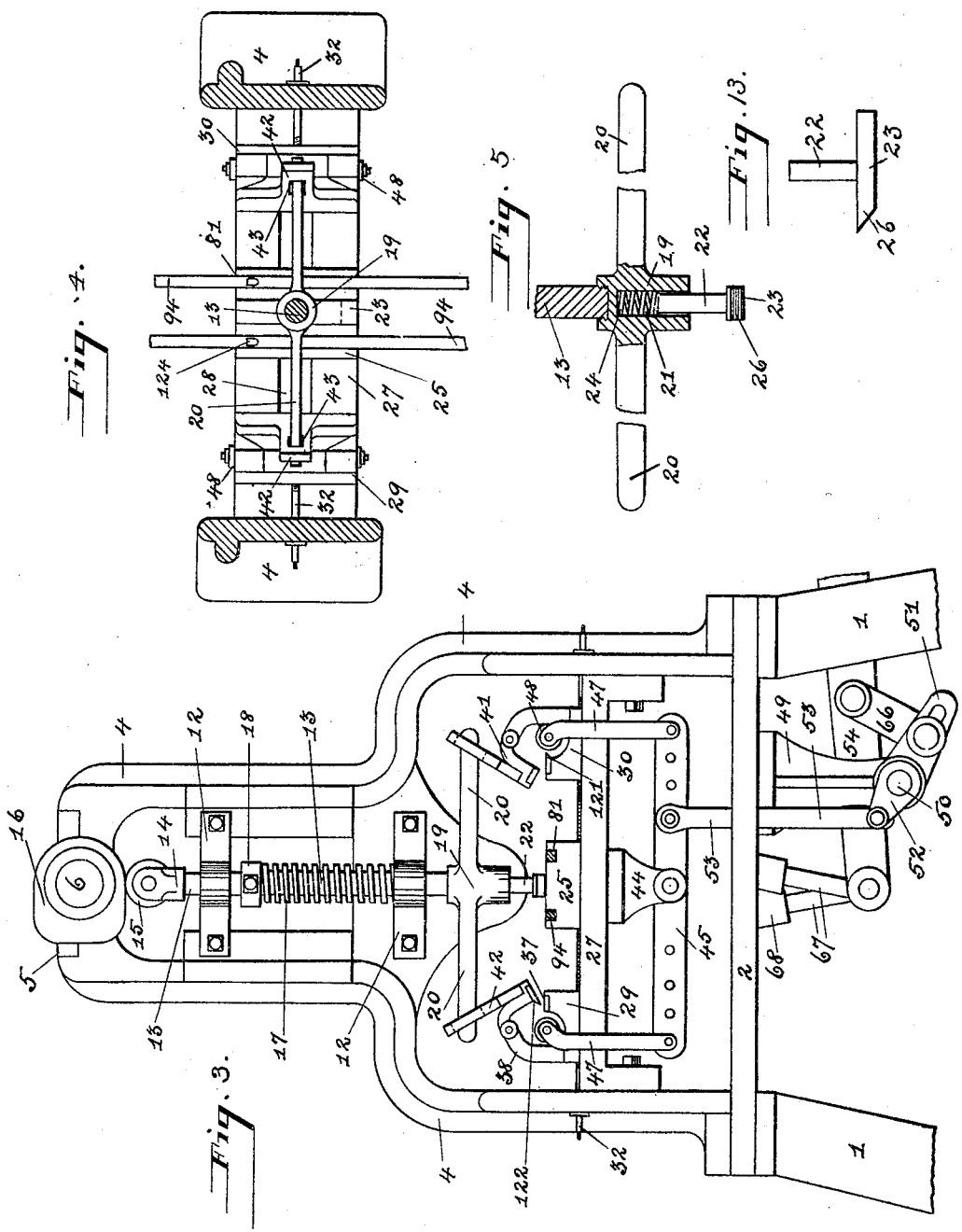
Witnesses:
Samuel J. Williamson
J. Ferdinand Vogt
Inventor:
Alexander Slaysman Jr.
By Mann & Co,
Attorneys.

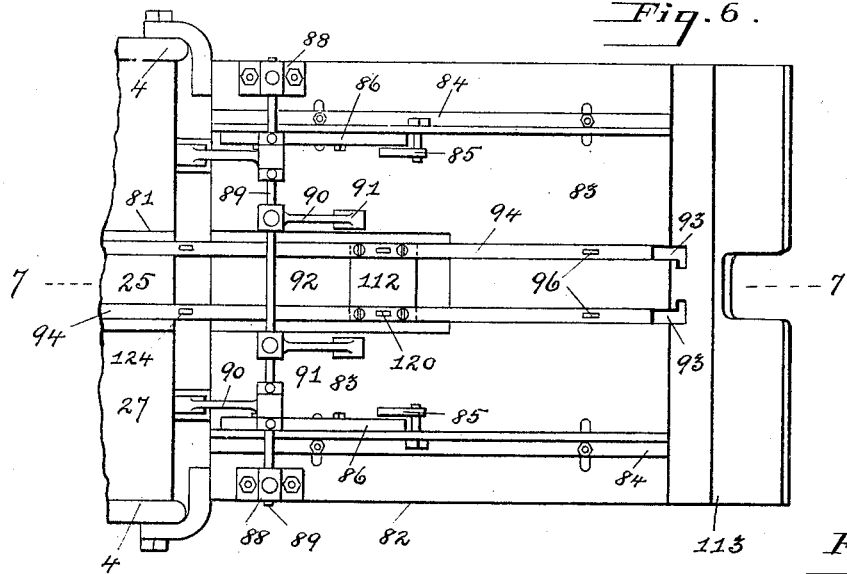
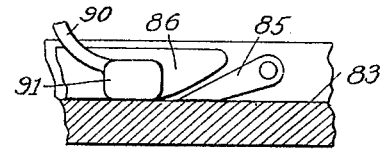
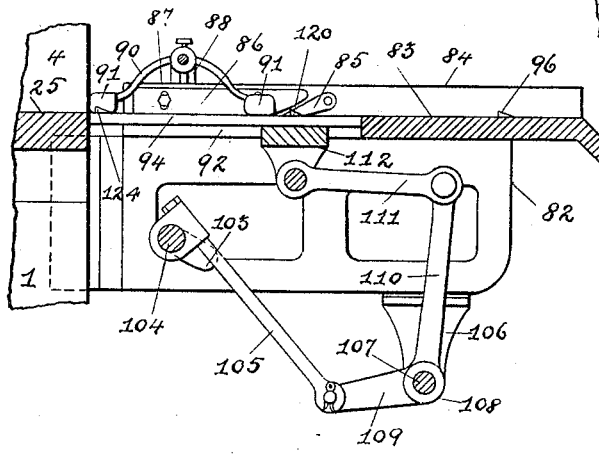
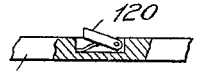
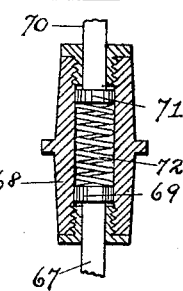

No. 799,409. PATENTED SEPT. 12, 1905.
A. SLAYSMAN, Jr.
MACHINE FOR FORMING THE SIDE SEAMS OF SHEET METAL BODIES.
APPLICATION FILED JAN. 25, 1904.
5 SHEETS—SHEET 5.
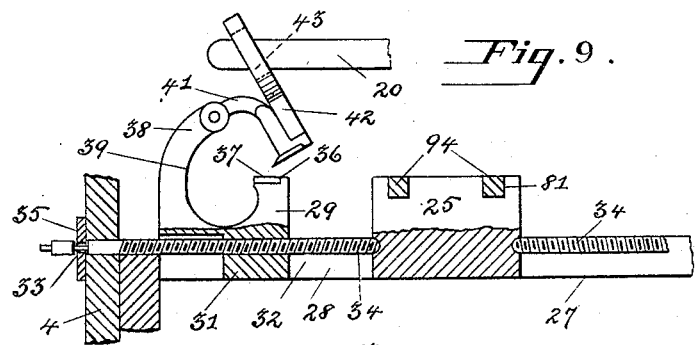
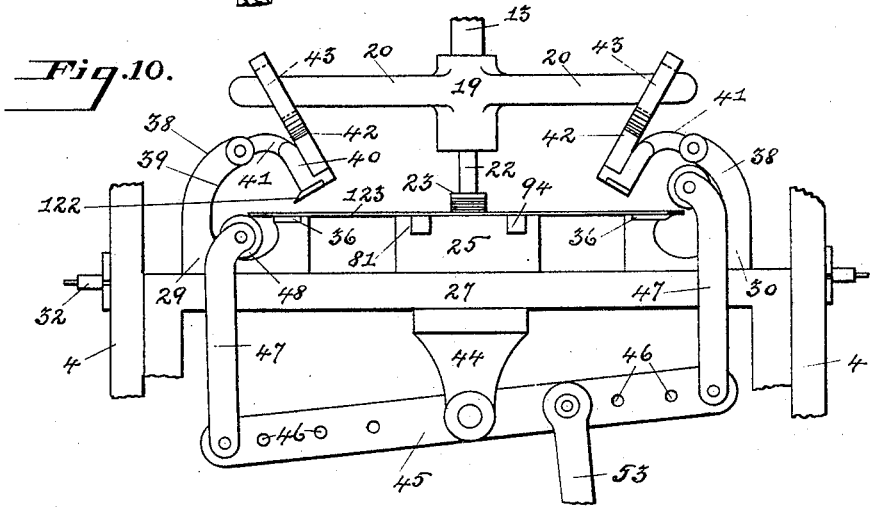
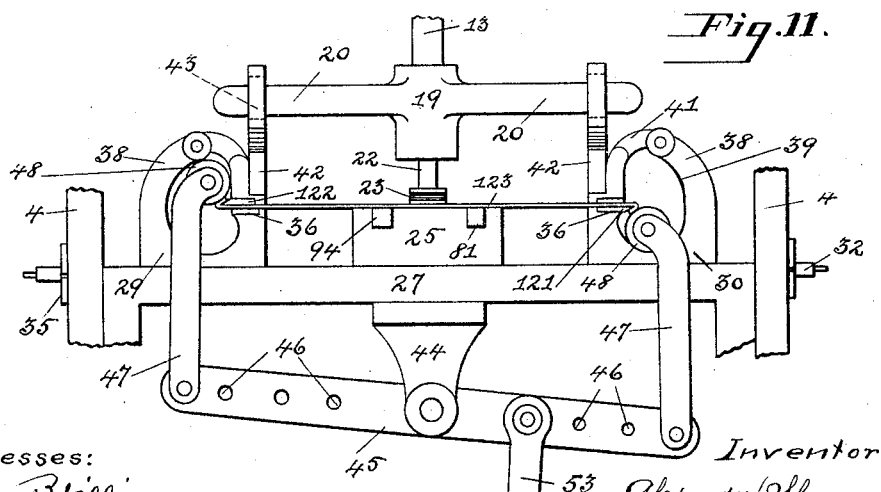
Witnesses:
Samuel J. Williamson
J. Ferdinand Vogt
Inventor:
Alexander Slaysman Jr.
By Mann & Co,
Attorneys:

UNITED STATES PATENT OFFICE.

ALEXANDER SLAYSMAN, JR., OF BALTIMORE, MARYLAND.

MACHINE FOR FORMING THE SIDE SEAMS OF SHEET-METAL BODIES.

No. 799,409.  Specification of Letters Patent.  Patented Sept. 12, 1905.

Application filed January 25, 1904. Serial No. 190,481.

*To all whom it may concern:*

Be it known that I, ALEXANDER SLAYSMAN, Jr., a citizen of the United States, residing at Baltimore, State of Maryland, have invented certain new and useful Improvements in Machines for Forming the Side Seams of Sheet-Metal Bodies, of which the following is a specification.

My invention relates to a machine for forming the side seams of sheet-metal bodies, and has for its object to provide an improved machine of this character which shall be simple both in construction and operation.

The invention consists of the improved construction, combination, and arrangement of the parts, as will be hereinafter more fully described and claimed, reference being made to the accompanying drawings, in which—

Figure 1:
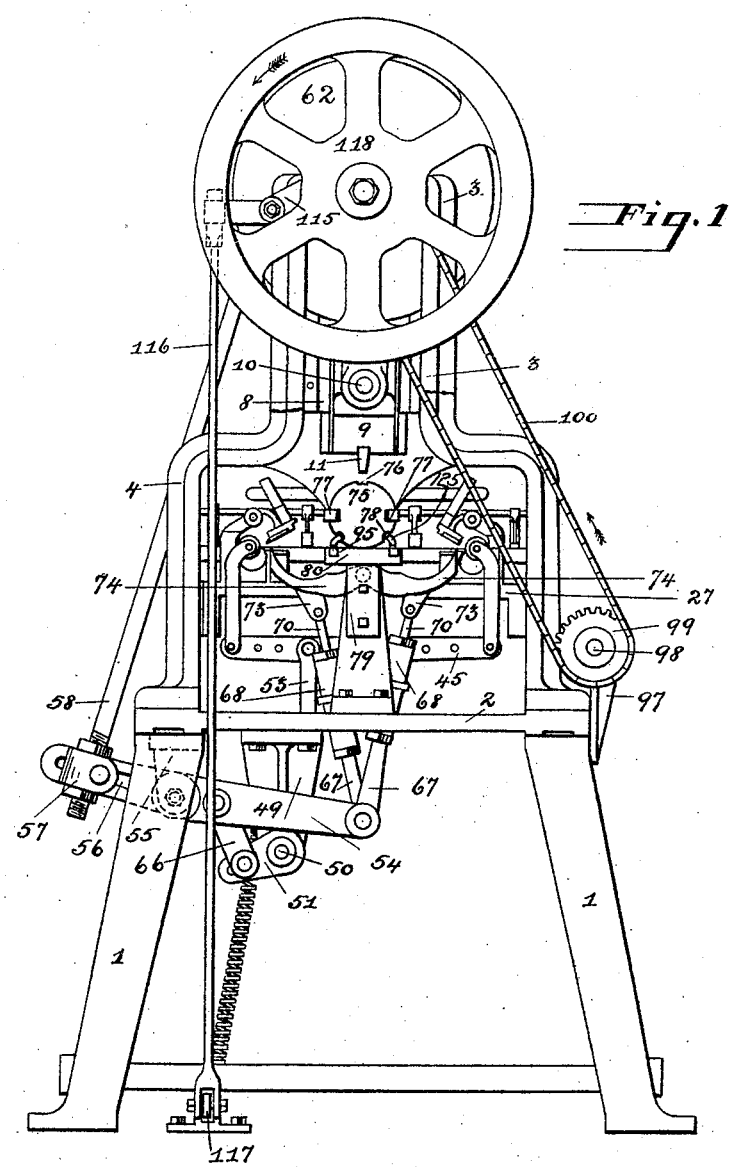
Figure 14:
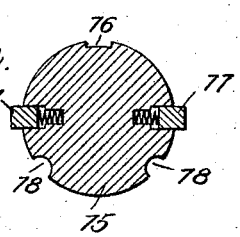
Figure 2:
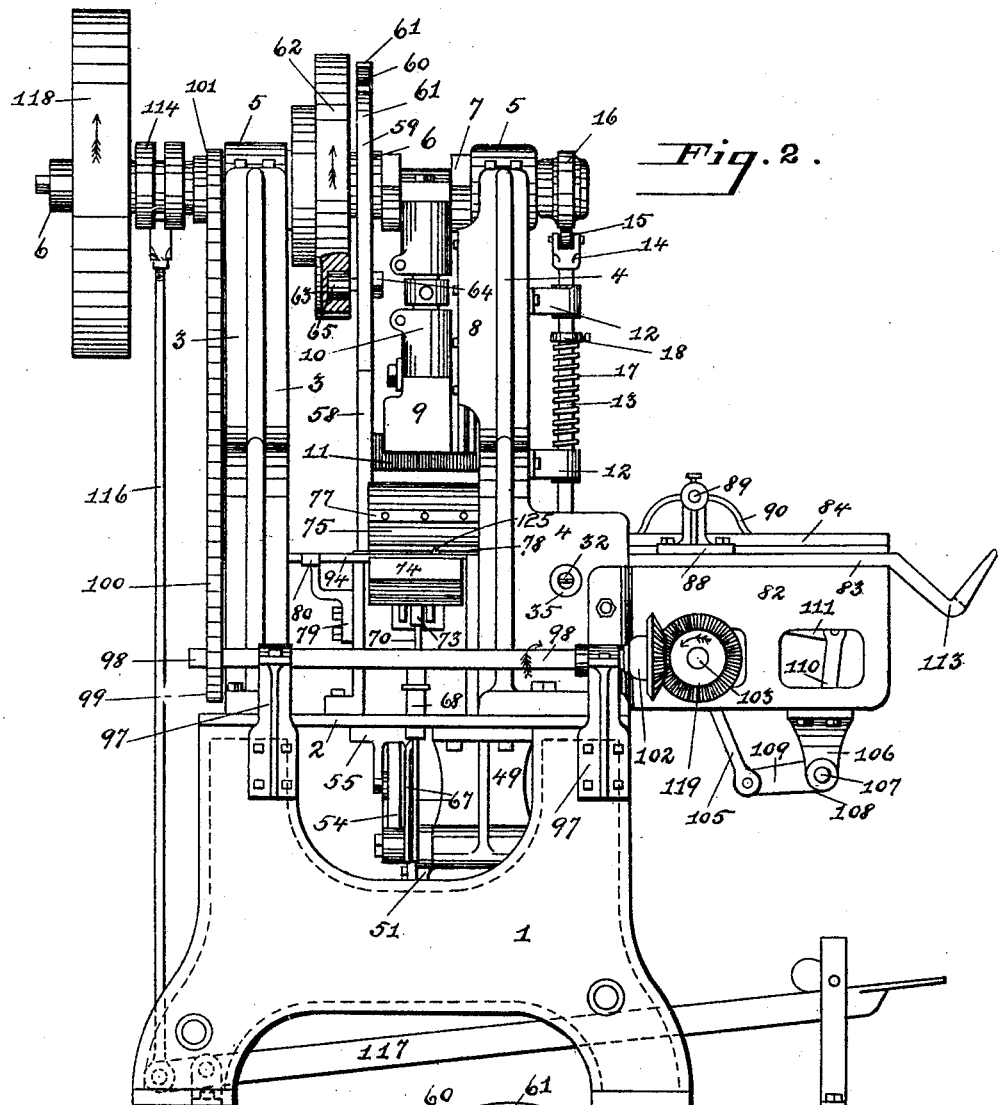
Figure 12:
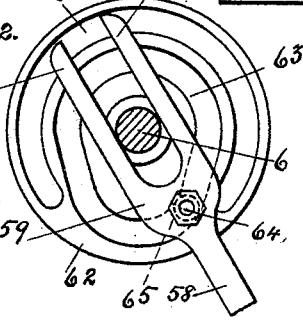

Figure 1 illustrates a front elevation of the machine; Fig. 2, a side elevation of the same; Fig. 3, a rear elevation of the edging mechanism; Fig. 4, a plan view of the same; Fig. 5, a detail sectional view of the presser-foot for holding the blank prior to the operation of the edging mechanism; Fig. 6, a plan view of the table and blank-feed mechanism; Fig. 7, a vertical section of the same on the line 7 7 of Fig. 6; Fig. 8, a detail sectional view of the yielding coupling interposed in the mechanism for operating the mandrel-jaws; Fig. 9, a detail sectional view of the mechanism for adjusting the edging devices; Figs. 10 and 11, detail views of the edging mechanism, the same being shown in two positions; Fig. 12, a detail of the cam and the bar operated thereby. Fig. 13 illustrates a detail side view of the presser-foot. Fig. 14 is a sectional detail of the mandrel to show the spring-pressed plates. Fig. 15 is a detail of the pawl device to prevent backward movement of the metal blanks, and Fig. 16 is a sectional detail of one of the yielding or spring-operated pawls in the blank-feeding bars.

In the drawings, 1 designates a base of any preferred construction having a top plate 2, which supports two vertically-extending brackets 3 and 4, each of which latter is provided with a bearing 5. These two bearings 5 support a horizontal shaft 6, having a crank 7. The front side of the vertical bracket 4 is provided with a slideway 8, in which a head 9 fits and has vertical movement. A connecting-rod 10 is pivotally connected at its lower end to the upper end of the head 9, while the upper end of said connecting-rod is attached to the crank 7 on the shaft 6. It will thus be seen that as the shaft and crank are turned the connecting-rod 10 will impart a vertical reciprocating movement to the head 9. A hammer-block 11 is fitted into a dovetail groove in the bottom of the head 9 and moves vertically therewith for a purpose as will be hereinafter described.

Attached to the rear side of the bracket 4 in any suitable manner (see Figs. 2 and 3) are two brackets 12, through which a vertical stem 13 extends. This stem is provided at its upper end with a bifurcated head 14, in which a roller 15 is mounted so as to turn in a vertical plane as it contacts with a cam 16 on the end of the shaft 6. A spiral spring 17 surrounds the stem 13, and the lower end of said spring rests on the lower bracket 12, while the upper end of said spring presses up against a collar 18 on the stem. This spring serves to keep the stem normally pressed up, so that the roller 15 will always be in contact with the said cam 16. The lower end of the stem 13 carries a head 19, having laterally-projecting arms 20, which latter extend or project in a direction at right angles to the direction of the shaft 6. The head 19 on the lower end of the stem has a central recess 21, (see Fig. 5,) which receives the shank 22 of a presser-foot 23. A spiral spring 24 also has position in the recess 21 and presses the foot down in contact with a bed-block 25. One end of the presser-foot 23 is beveled at 26 from its bottom surface upwardly to its end, for a purpose as will presently appear. A horizontal bed 27 is secured to the bracket 4 and supports the bed-block 25, and this bed 27 is provided with a central longitudinal slot 28, (see Figs. 4 and 9,) which extends in a direction parallel with the arms 20. Two seam-forming blocks 29 and 30, each of which is provided with a bottom web 31, are seated on the horizontal bed, with their webs projecting down into said slot 28 to prevent lateral displacement of the blocks. These blocks are each provided with means whereby they may be adjusted horizontally on the bed 27 in a direction toward or away from each other, as will now be described.

A rod 32 extends horizontally through the vertical bracket 4 and is provided at its outer end with an annular groove 33, (see Fig. 9,) which latter has position immediately adjoining said bracket. The inner ends of said rods are provided with screw-threads 34, which screw through the webs 31 on the blocks 29 and 30 and impinge against the sides of the bed-block 25. A plate 35 is secured to the side of the bracket 4 and has its edge fitting in an annular groove 33 in said rod and will permit the rod to be turned, but will prevent lengthwise movement of said rod. It is obvious, therefore, that by turning the rods 32 the blocks 29 or 30 may be moved in a horizontal plane in a direction parallel with the arms 20.

The seam-forming blocks 29 and 30 are each provided with an anvil 36, the top surface 37 of which is in the same horizontal plane as the top surface of the bed-block 25. (See Figs. 3, 9, 10, and 11.) These seam-blocks are also provided with upwardly-projecting curved arms 38, which latter on their inner faces are curved to form a cam-surface 39. A clamp device 40 is provided with an outwardly-curved arm 41, which is pivotally connected to the upper end of the curved arm 38 of the seam-block, and said clamp is also provided with an upwardly-projecting straight arm 42, which has a central slot 43. (See Fig. 4.) This slot 43 is provided in the arm 42 so as to receive the end of the arm 20, whereby the clamp device 40 may be hung or suspended from said arm 20 and be moved through an arc of a circle as the arm 20 is raised or lowered.

A bracket 44 is secured to the bottom side of the horizontal bed 27 and pivotally supports a beam 45. This beam is provided with a plurality of holes 46, arranged on opposite sides of its pivot, and the ends of said beam are pivotally connected to vertically-projecting arms 47, each of which at its upper end carries a roller 48. These rollers 48 extend the entire length of the seam-blocks 29 and 30 and have position in front of the anvils 36 and are adapted to contact with and be guided by the cam-surfaces 39 as the arms 47 are reciprocated when the beam 45 is rocked.

The mechanism for rocking the beam 45 and reciprocating the arms 47 will now be described.

Secured by bolts to the bottom of plate 2 is a hanger or bracket 49, through which a rock-shaft 50 extends. This shaft carries a slotted arm 51 at its forward end and another rock-arm 52 at its rear end. A rod 53 connects the rock-arm 52 with the beam 45, so that the rocking of the shaft 50 will impart a like movement to the beam. A lever 54 is pivotally supported in a bracket 55, which latter is also bolted to the bottom of plate 2, and said lever is provided at its outer end with a slot 56, in which a head 57 is pivotally secured. A rod 58 is adjustably secured at its lower end in said head 57, and the upper end of said rod is provided with a flat broad head 59, which latter is provided with a central slot 60, which divides the head into two prongs 61. (See Fig. 12.) These prongs 61 straddle or take on opposite sides of the shaft 6, immediately adjoining a cam 62, which latter is provided with a cam-groove 63. A pin 64 passes through the head 59 of the rod 58 and carries a roller 65 on its inner end, which takes in said cam-groove 63. As the shaft 6 and cam 62 are revolved the roller 65 will be raised or lowered according to the cam-groove 63, and this raising and lowering of the roller imparts a like movement to the rod 58, and the movement of said rod in turn rocks the lever 54, the crank-arm 51, through a link 66, the rock-shaft 50, rod 53, beam 45, and arms 47.

The mechanism employed for folding the blank around the mandrel after the seam-hooks have been formed will now be described.

Pivotally secured to the inner end of the lever 54 are two bars 67, which project upwardly and enter the lower ends of couplings 68, (see Fig. 8,) and each of these bars is provided in the present instance with a head 69, which has position on the interior of said coupling. Rods 70 have each a head 71 on the lower ends, which also have position on the interior of the said coupling and confront the heads 69, and a stiff spiral spring 72 has position in said coupling between said heads 69 and 71. The upper end of each of said rods is pivotally connected to a lug 73 on the mandrel-clamping jaws 74. These clamping-jaws are pivoted in any suitable manner, so as to be swung upwardly around the mandrel 75 for the well-known purpose of wrapping the blank around the mandrel, as will hereinafter more fully appear.

The mandrel may be constructed in any well-known manner; but in the present instance it is provided on its highest point with a horizontal groove or depression 76, which has position directly beneath the hammer 11. The mandrel in the present instance is also provided at diametrically opposite sides with outwardly-spring-pressed plates 77, the object of which will also be presently pointed out. The circumference of the mandrel is further provided on opposite sides with parallel longitudinal grooves 78, which are utilized during the operation of ejecting the seamed bodies.

In front of the mandrel, but beneath the latter, is a bracket 79, which supports a horizontal plate 80. This plate is provided at opposite sides with horizontal grooves 95, which extend in a direction parallel with the grooves 78 in the mandrel and in line with the grooves 81 in the bed-block 25. The top surface of said plate 80 is also in the same horizontal plane as the top surface of the said bed-block 25. The purpose of these grooves 78 and 81 will be set forth in the description relative to the blank-feeding mechanism, which will now be described, reference being made particularly to Figs. 2, 6, and 7.

A table 82 is secured by bolts to the rear bracket 4 of the machine and comprises a horizontal bed 83, the top surface of which is flush with the top surface of the bed-block 25, and the bed of this table is provided at opposite sides with longitudinal guide-strips 84. The inner vertical walls of these guide-strips are provided with pivoted pawls 85, which are normally held down by their own weight in contact with the surface of the bed 83. The inner walls of the guide-strips are each also provided with a bar 86, each of which has vertical slots 87, through which a bolt loosely passes and screws into said guide-strip. These bars 86 by means of their slots are permitted to have a slight vertical movement, and the ends of said bars adjoining the pivoted pawls 85 are provided with a bevel (see Fig. 7) beneath which the flat sheet-metal blanks may pass so as to move under the bars 86. At each side the bed 83 is also provided with vertical bearings 88, which latter support a horizontal rod 89. This rod extends crosswise of the table or at right angles to the guide-strips and carries a plurality of downwardly-curved arms 90, each of which is provided with a weight 91. These weights are slightly rounded on their bottoms in order to permit the blanks to freely pass beneath them and the weights themselves merely serve to hold the blanks down flat on the bed. The bed 83 is also provided with a central longitudinal slot 92 and two longitudinal grooves 93, which latter are in line with the grooves 81 in the bed-block. A sliding bar 94 has position in each of the grooves 93, and said bars extend horizontally throughout the length of the bed and also pass through the grooves 81 in the bed-block and through the grooves 95 in the plate 80 beneath the mandrel. These bars 94 are each provided with a plurality of pawls 96, 120, and 124, which are spaced from each other a distance equal to the horizontal stroke of the bars, which movement is made by means of the following mechanism, reference being had particularly to Figs. 2 and 7: Secured to the base 1 and extending in a vertical direction are two bearings 97, which support a horizontal shaft 98. One end of this shaft carries a sprocket-wheel 99, around which a chain 100 passes, and said chain extends upwardly in an inclined direction and passes around a sprocket 101 on the shaft 6. The other end of the shaft 98 carries a bevel gear-wheel 102, which latter meshes with a gear 119 on the end of a horizontal shaft 103, which extends in a crosswise direction beneath the bed 83. The shaft 103 is provided midway between its ends with a crank 104, which latter supports one end of a connecting-rod 105. A hanger 106 is bolted to the framework beneath the bed 83, and said hanger supports a horizontal rock-shaft 107, on which a bell-crank lever 108 is mounted. One arm 109 of this bell-crank lever is connected to the rod 105, while the other end, 110, of said lever is connected to one end of a link 111, the other end of which latter is pivotally connected to a block 112, which is attached to the sliding bars 94. It will thus be seen that as the crank-shaft 103 is revolved a reciprocating movement will be imparted to the sliding bars 94.

At one end of the table 82 the bed is provided with a V-shaped trough 113, in which the sheet-metal blanks are placed and from which they are taken one at a time and laid on the bed in front of the first pair of pawls 96, which latter upon the forward movement of the bars 94 will move the blank upward one step.

A clutch 114 of any suitable construction is carried on the shaft 6, and a pivoted tongue 115 is operated by a vertical rod 116 and a foot-treadle 117, by means of which the mechanisms may be thrown into or out of operation. A pulley 118 is on the end of the shaft 6, around which a belt (not shown) may be run to impart motion thereto.

The operation is as follows: Assuming that the treadle and clutch mechanisms have been operated and the mechanism of the entire machine is performing its various movements, the sheet-metal blank is placed flat down on top of the bed 83, between the guide-strips 84 and immediately in front of the pawls 96 on the bars 94. The bars are then moved forward a full stroke and the pawls push the blank beneath the pivoted pawls 85 and bars 86, which latter rest on the top surface of the blank at opposite ends and keep the blank down flat on the bed. The pivoted pawls 85 will now hold the blank and prevent its return when the bars are moved back. The bars 94 are then retracted or returned to their normal position, and the second pair of pawls 120 will be depressed as they pass beneath the blank and spring up again as they pass from under the blank at the opposite side. The next forward movement of the bars 94 will feed a second blank up and will also move the first blank onto the bed-block 25 with its ends resting on the anvils 36, and the center of the blank will be held down on said block by the presser-foot 23, as seen in Fig. 10. This first blank is now in position to have its opposite edges hooked. The cam 16 now depresses the stem 13 and arms 20 and lowers the clamp devices 40 on top of the blank and over the anvils 36. It will be noticed that one anvil is provided with a die-plate 121, while the clamp device coöperating with the other anvil is provided with a die-plate 122. When the clamp devices are seated on the blank, the die-plate 121 has position beneath the blank at one end, while the die-plate 122 at the opposite end of the blank has position on top of the latter. The bars 94 are again returned for another blank, and while this return operation takes place the cam 62 raises the rod 58 and the outer end of lever 54, while the inner end of said lever 54 is lowered, which rocks the shaft 50, pushes the rod 53 up, and rocks the beam 45. The rocking of beam 45 raises one arm 47 and lowers the other arm. As the former arm is raised the roller 48 will be guided by the cam-surface 39 and will bend the projecting end of the blank 123 upwardly over the edge of the die-plate 122 and form an upwardly-turned hook, while the other arm 47 in moving down will cause its roller 48 to bend the opposite end of the blank down over the die-plate 121 and form a downwardly-inclined hook, as shown in Fig. 11. The next forward movement of the bars 94 will cause the pawls 124 to engage the hooked blank and push it beneath the mandrel 75 and over the clamping-jaws 74, where it is to be wrapped around the mandrel. The mechanism for accomplishing this operation will now be described, Fig. 1 being particularly referred to. The power for this operation is transmitted through the cam 62, which depresses the rod 58 and raises the inner end of the lever 54. The elevation of the lever 54 raises the two bars 67 and also swings the clamping-jaws 74 up around the mandrel. The interposition of the couplings 68 provides a yielding connection between clamping-jaws 74 and the rocking-lever 54 and will provide a relief for the bars 67 at times to suit the variation in the thickness of the metal of the blanks. As the blank has position over these jaws when the latter are raised the same will be folded around the mandrel and the hook edges interlocked. The cam 62 then raises the rod 58, and thereby releases the clamping-jaws, and as the latter are released the yielding plates 77 press outwardly against the hooked body on the mandrel to distend the latter and maintain the hooked edges in the interlocked position until the crank 7 forces the connecting-rod 10, head 9, and hammer 11 down on the hooked edges and flattens the same in the groove 76 of the mandrel. The hammer is immediately raised, the bars 94 again moved forward, and the pawls 125 pass through the grooves 78 of the mandrel and push the cylindric body from beneath the hammer to eject the same.

Having thus fully described my invention, what I claim as new, and desire to secure by Letters Patent, is—

1. A machine of the class described having a bed; an anvil; a swinging clamp device adapted to coact with said anvil and having an arm; a reciprocating stem, and an arm movable with said stem and coacting with the arm of the swinging clamp device whereby the latter will be operated when the stem and arm are reciprocated.

2. A machine of the class described having a bed; an anvil; a swinging clamp device coacting with the anvil and having an arm; a reciprocating stem; an arm movable with said stem and loosely connecting with the arm of the clamp device, whereby when the stem is reciprocated the clamp device will be moved through an arc of a circle, and means for bending the end of the blank while the same is clamped.

3. A machine of the class described having a bed; an anvil at each side of said bed; a swinging clamp above each anvil, and means also above the anvils and connecting with the swinging clamps to raise the latter from the anvils.

4. A machine of the class described having a bed; a seam-forming block at each end of said bed, said blocks each having a cam-surface and an anvil; a reciprocating stem; two arms projecting laterally with respect to said stem; a clamp device pivoted to each of said blocks and each clamp device having an arm provided with a slot into each of which one of the arms of the stem takes whereby when the stem is reciprocated the clamp devices will be operated, and rollers adapted to be moved in contact with the cam-surfaces of said blocks whereby to bend both ends of the blank.

5. In a machine of the class described the combination with a bed, of an anvil on which the end of the blank rests; a swinging clamp having a projecting slotted arm; an arm passing through the slotted arm of said clamp; means for moving said arm toward and away from said anvil and operating the swinging clamp, and means for bending the end of the blank while the same is clamped on the mandrel.

6. In a machine of the class described the combination with a bed, of an anvil at each side of said bed on which the ends of the blank rest; a reciprocating stem; arms carried by said stem and each having position over one of said anvils, a clamp device sustained by each of said arms and means for bending the end of the blank while the same is clamped.

7. In a machine of the class described the combination with a bed; a seam-block at each side of said bed and provided with an anvil and an upwardly-projecting arm; a clamp device pivoted to each of said arms; said clamp devices each having an arm provided with a slot; a stem reciprocating between said seam-blocks and carrying two laterally-projecting arms each of which extends through one of the slots in the arms of said clamp devices, and means for bending the end of the blank while the same is clamped.

8. In a machine of the class described the combination with a bed; a seam-block supported on each end of said bed and said blocks each having an anvil and an upwardly-projecting arm; a clamp device pivoted to each of the upwardly-projecting arms of said seam-blocks and said clamps each having a slotted arm; a stem arranged to be reciprocated between said anvils and carrying two arms each of which projects through the slot in one of the arms of the clamp device; means for adjusting each anvil and its clamp device simultaneously in a horizontal direction and means for bending the end of the blank while the same is clamped.

In testimony whereof I affix my signature in the presence of two witnesses.

ALEXANDER SLAYSMAN, Jr.

Witnesses:
   CHARLES B. MANN, Jr.,
   G. FERDINAND VOGT.